United States Patent [19]

Siska et al.

[11] Patent Number: 4,482,042
[45] Date of Patent: Nov. 13, 1984

[54] RETARDER DEVICE FOR MOVING OBJECTS

[75] Inventors: Thomas J. Siska, Norridge, Ill.; James H. Obermeyer, Crown Point, Ind.

[73] Assignee: UNR Industries, Inc., Chicago, Ill.

[21] Appl. No.: 378,865

[22] Filed: May 17, 1982

[51] Int. Cl.$^3$ .......................................... B65G 13/075
[52] U.S. Cl. .................................. 193/35 A; 193/40; 188/187
[58] Field of Search .................. 193/35 A, 32, 37, 40; 188/184, 185, 187; 198/633

[56] References Cited

U.S. PATENT DOCUMENTS

| | | | |
|---|---|---|---|
| 3,314,514 | 4/1967 | Hundhausen et al. | 193/35 A |
| 3,655,021 | 4/1972 | Froio | 193/35 A |
| 3,700,078 | 10/1972 | Froio | 193/35 A |

*Primary Examiner*—Jeffrey V. Nase
*Assistant Examiner*—Daniel R. Edelbrock
*Attorney, Agent, or Firm*—Clement and Ryan

[57] ABSTRACT

A retarder device for applying gradually increasing braking force to a moving object such as a pallet rolling on a gravitationally actuated conveyor system. The device produces a three-stage application of braking force to the moving object as the object moves along its predetermined path and rolls over a brake wheel that actuates a gear train. The gear train comprises a plurality of intermeshed gears that progressively increases the angular velocity of the rotating gears as the first gear in the train is rotated. A fly wheel carrying at least one pivotally mounted fly weight, and preferably a plurality of weights equally spaced around the wheel, is fixedly secured to the terminal gear of the train. The inertia of the various members of the gear train, the fly wheel, and the fly weights applies the first stage braking force to the moving object. The fly weights pivot outward due to centrifugal forces developed from rotation of the fly wheel, and press against a nearby friction member to develop a frictional contact. The resulting frictional force constitutes the second stage braking force. A still larger braking force is applied during a third stage in which the further pivoting of the fly weights pushes against the adjacent friction member with sufficient force that the fly wheel itself is pressed in the opposite direction against at least one reaction snubber mounted on the support means adjacent the other side of the fly wheel. To produce the larger thirdstage braking force, the reaction snubber or snubbers and the fly wheel have a higher coefficient of friction than the fly wheel and the aforementioned friction member.

26 Claims, 11 Drawing Figures

RETARDER DEVICE FOR MOVING OBJECTS

FIELD OF THE INVENTION

This invention relates to a retarder device that applies gradually increasing braking force to a moving object as it accelarates along a predetermined path, such as a pallet, package or other load rolling down hill on a gravitationally actuated conveyor system.

BACKGROUND OF THE INVENTION

Pallet flow systems in which load-bearing pallets are caused to roll down an inclined track are in common use in warehouses and other materials handling operations. Typically, two rows of "skate wheels" are rotatably supported in two parallel steel channel shapes to provide an inclined track having a grade that is usually about 3 or 4 per cent, along which the pallets loaded with merchandise or other goods roll under the influence of gravity.

The pallet commonly has metal runners on its underside, together with a formed ridge to guide the pallet on a straight path as it flows down the inclined track, which is typically 20' to 100' or even more in length. Each pallet may carry a load of merchandise weighing as much as 3,000 pounds or more, so it is essential that a device or mechanism be provided for retarding the descent of each pallet down the long inclined track in order that the pallet will not pick up too much speed for safe operation.

Since some loads are very large, the retarding action provided by the retarder device or mechanism must be positive and reliable. In addition, since the load on the pallet can range from a very rigid container to poorly packaged, fragile materials, the retarding action must be gradual, with minimal shock to the load carried by the pallet.

Several retarder devices utilizing gear trains to control the speed of moving objects are known. Typically, the gear train terminates with a brake that is centrifugally actuated by rotation of the last rotatable member of the gear train. A common form of brake in this type of retarder device includes brake shoes that are directed radially outward by centrifugal forces to bear against a fixed brake drum. These drum types of retarder devices are not as efficient as would be desired, and generally do not provide for as smooth or gradual application of braking force as is desirable.

SUMMARY OF THE INVENTION

In the retarder device of this invention, the novel construction of the device produces a three-stage application of braking force to a moving object as the object moves along a predetermined path. When the retarder device is used with a pallet flow system such as described above, a plurality of the devices are used, placed strategically along the inclined path down which the pallets roll.

First Stage Braking Force

Support means is provided for mounting the device in a fixed position adjacent the predetermined path followed by the moving object. A gear train which comprises a plurality of rotatably mounted gears, including at least a first gear and a terminal gear, is mounted in the support means. The gears are intermeshed so as to progressively increase the angular velocity of the rotating gears as the first gear in the train is rotated.

A rotatably mounted brake wheel is positioned to be contacted by the moving object, to translate the linear movement of the object along its predetermined path into rotational movement of the first gear. The rotational movement is transferred from one gear to the next in the intermeshed series so as to progressively increase the angular velocity of the rotating gears, with a fly wheel rotatably mounted in the support means and fixedly secured to the terminal gear of the train. The inertia of the various members of the gear train and the fly wheel (with additional weights attached to the fly wheel as described below), together with whatever frictional resistance is presented by the rotating parts of the device, applies the first stage braking force to the moving object.

Second Stage Braking Force

In the best mode or preferred embodiment of the invention, at least two fly weights are pivotally attached to the fly wheel on one side thereof at positions that are preferably equally spaced angularly around the wheel. Each of the fly weights is normally resiliently biased in a retracted position in which a portion of the weight, and only that one portion, extends outward normal to the side of the fly wheel a first predetermined distance.

In response to centrifugal forces generated by the rotation of the fly wheel and the fly weights mounted thereon when that rotation increases to an angular velocity greater than a first predetermined angular velocity, each of the fly weights moves to an extended position in which one portion of the fly weight, and only that portion, extends outward normal to the side of the fly wheel an additional or second, predetermined distance. The angular velocity increases as just indicated when the linear speed of the moving object rises above a first predetermined linear speed.

A friction member having a substantially planar surface is mounted parallel to, and—when the fly wheel and fly weights are at rest—spaced from, the fly weights by said second predetermined distance measured normal to the side of the fly wheel. The friction member may conveniently be the wall of the housing for the gear train, fly wheel, and fly weights thus far described. When the angular velocity of the fly weights rises above the first predetermined angular velocity, the fly weights move outward until a portion of each weight, and only that one portion, extends outward normal to the fly wheel by the first predetermined distance plus the second predetermined distance, thus bringing the fly weights into frictional contact with the friction member.

Each of the fly weights pivots about a pivot located on the fly wheel, and the fly weight has contact with a predetermined area of the friction member when it is pressed against the latter. The resulting frictional force applies the second stage braking force to the moving object.

If desired, a single fly weight may be pivotally attached to the fly wheel, with the single weight acting in the same way as the plurality of fly weights in the preferred form of the invention. In such case, a balancing counterweight may or may not be attached to the fly wheel.

Third Stage Braking Force

The preferred form of this device includes a plurality of reaction snubbers, positioned on the opposite side of the fly wheel from the fly weights, that provide an even greater frictional force to the rotating fly wheel when the moving object reaches a second predetermined linear speed and the rotating fly wheel and fly weights reach a second predetermined angular velocity.

When these velocities are reached, each of the fly weights is moved outward normal to the fly wheel more than the first predetermined distance plus the second predetermined distance discussed above. As a result, the fly weight is pushed against the friction member hard enough that at the same time it pushes in the opposite direction against the fly wheel, through its pivoted attachment to the wheel, to push the latter against a biasing means that normally biases the fly wheel away from the reaction snubber. When the biasing force just referred to is overcome, the rotating fly wheel is pushed against the reaction snubbers, which have a higher coefficient of friction with respect to the fly wheel than the coefficient of friction of the fly weights and the friction member against which the fly weights press after being caused to pivot. This produces in the third stage an even higher braking force than was applied in the second stage. Furthermore, the described movement of parts produces a gradually increasing friction force on the wheel as its speed of rotation increases and the fly weights tend to pivot still farther.

If desired, a single reaction snubber may be used instead of a plurality. Unless the single snubber is circular in form and symmetrical about the shaft of the fly wheel, a roller or similar means must then be provided to produce an evenly distributed opposition against the thrust that would otherwise be applied to the hub of the rotating fly wheel. Or, alternatively, the strength of the hub and shaft assembly may be increased to withstand the off-balance forces produced by the single eccentrically positioned snubber.

Application of braking forces in the three stages described provides a reliable retarding of the moving objects such as pallets rolling down an inclined path, without applying any braking force too abruptly.

The invention will now be described in connection with specific embodiments disclosed in the drawings.

DETAILED DESCRIPTION OF AN ILLUSTRATRATIVE EMBODIMENT OF THE INVENTION

Figure 1:
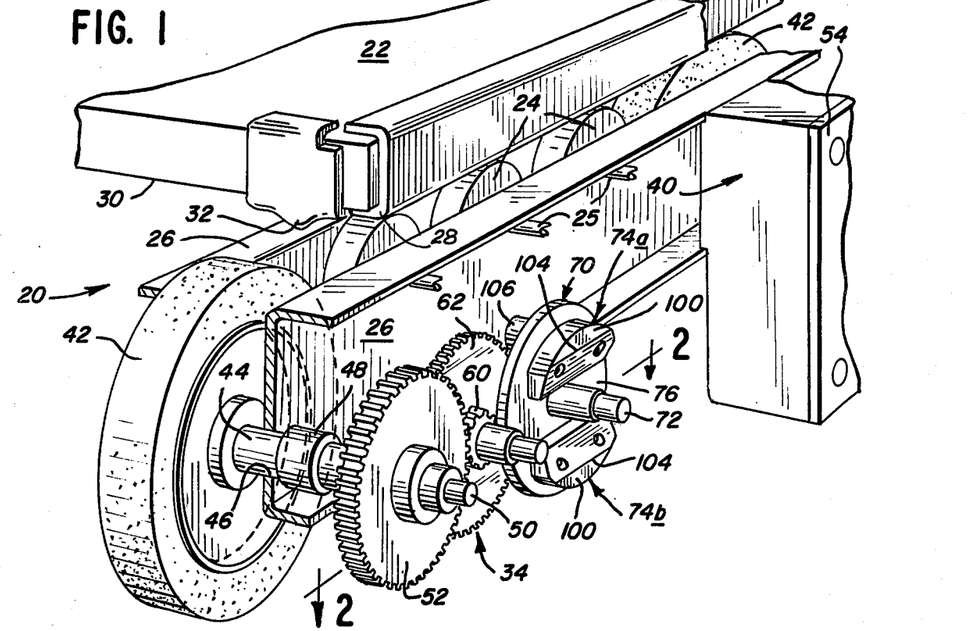
FIG. 1 is a broken-away perspective view of a section of an inclined track with a portion of a pallet rolling on the "skate wheels" of the track towards the left in the drawing, with the gear train of the retarder device of this invention shown in place but with the housing for those particular rotating parts omitted for clarity.
Figure 10:
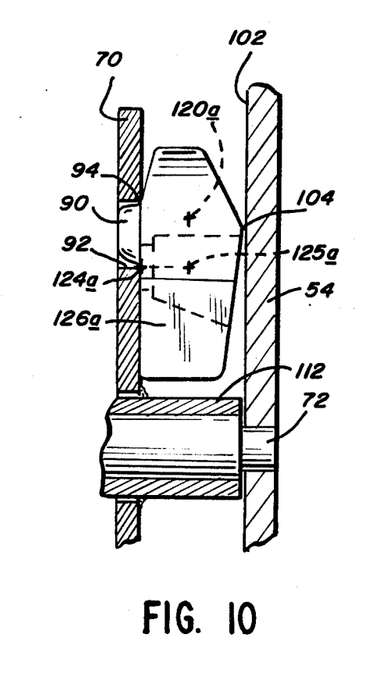
FIG. 10 is a fragmentary sectional view of the upper portion of a fly wheel and an upper fly weight of an alternative shape when those members are at rest.
Figure 11:
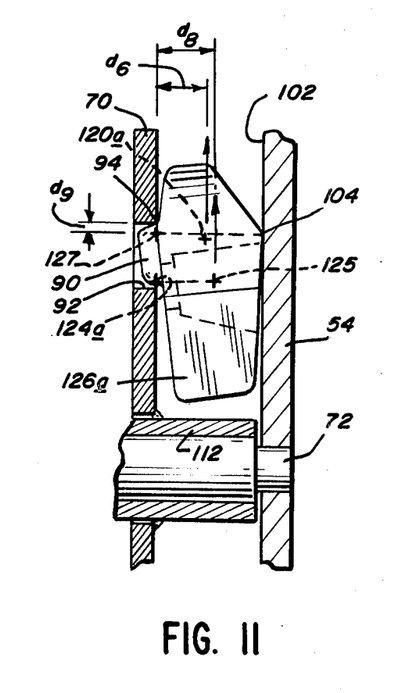
FIG. 11 is a stop-action view of the same members as in FIG. 10, shown in the positions they occupy when the retarder device of this invention is in the second stage of its operation.

FIG. 1 shows a portion of a pallet flow system as an example of how the retarder device of this invention can be used with a succession of moving objects following a predetermined path on a gravitationally actuated conveyor system. FIGS. 2 through 9 explain how the embodiment shown in FIG. 1 operates. FIGS. 10 and 11 illustrate an alternative embodiment of the fly weights that are used with this device.

Pallet Flow System

In pallet flow system 20, a succession of load bearing pallets 22 roll down an inclined track, to be conveyed from one location to another in a warehouse or other materials handling operation. In FIG. 1, one row of "skate wheels" 24 is shown rotatably mounted on shafts 25 supported by a pair of steel channel shapes 26.

A similar row of skate wheels (not shown) is rotatably supported in another pair of steel channel shapes disposed parallel to channel 26. Together, the two rows of skate wheels provide an inclined track along which pallets 22 loaded with merchandise or other goods roll under the influence of gravity.

As seen in FIG. 1, each pallet 22 commonly has a metal runner 28 on its underside 30, with formed ridge 32 guiding the pallet on a straight path as it flows down the inclined track formed by the parallel rows of skate wheels.

Retarder Device

Retarder device 34 applies a three-stage braking force to moving pallets 22 as they follow the predetermined path defined by skate wheels 24. The forces applied increase to a very sizeable braking force in the third stage, but approach the maximum value gradually throughout all three stages.

The retarder device is mounted on support means including channel shape 26 and housing 40, in a fixed position adjacent the predetermined path defined by wheels 24. A suitable number of retarder devices 34 can be installed in an existing pallet flow track by removing a group of skate wheels 24 and replacing them with the device at periodic intervals. Preferably, the speed retarder device is inserted at locations spaced approximately one pallet length along the inclined track, so that as the moving pallet breaks contact with one retarder device, it immediately contacts the next such device.

Brake Wheel

In the embodiment shown, successive brake wheels 42 are separated by a group of three skate wheels 24. Each wheel 42 is rotatably mounted in channels 26, with its shaft 44 journalled in apertures 46 defined by the channels.

The retarder devices may if desired be positioned in a row of skate wheels on only one side of the pallet track, or alternated from one row of skate wheels to the other as one proceeds down the inclined tracks. However, they are preferably inserted in the rows of skate wheels on both sides of the track.

The rim of brake wheel 42 is preferably formed of a resilient, friction-producing material. Rubber of approximately 40 durometer hardness is suitable.

Brake wheel 42 is positioned to be contacted by metal runner 28 of each pallet 22 as the pallet moves down the inclined path. This contact causes the linear movement of pallet 22 along its predetermined path to be translated into rotational movement of brake wheel 42. The resulting rotational movement is transmitted by shaft 44, journaled in bearing 48, to main toothed gear 52, fixedly secured to the shaft at its outer end 50.

Support Means, Including Friction Member

Gear 52 and the associated parts of the retarder device of this invention are ordinarily enclosed in housing 40, which comprises a part of the support means for the device. In FIG. 1, casing 40 for retarder device 34 is omitted for clarity, and the casing is shown for the next preceding retarder device upstream of device 34.

Outer wall 54 of casing 40 helps to enclose gear 52 and the other parts of retarder device 34. Outer wall 54, which has a substantially planar inner surface positioned substantially parallel to side 76 of fly wheel 70 (described below) and is preferably formed of steel, also serves as a friction member for a purpose to be described below.

Gear Train And Fly Wheel

Gear member 52 is the first gear of a gear train mounted in casing 40 that comprises a plurality of rotatably mounted gears intermeshed so as to progressively increase the angular velocity of the rotating gears as gear 42 is rotated.

Smaller, driven gear 60 is rotatably mounted in support means 40, engaged in intermeshing relationship with main gear 52. Intermediate gear 62 is fixedly secured to driven gear 60.

The terminal gear of the gear train is second smaller, driven gear 64 (best seen in FIGS. 2 and 3), which is rotatably mounted in casing 40, engaged in intermeshing relationship with intermediate gear 62. In the embodiment shown, intermediate gear 62 is of generally the same size as main gear 52. Smaller driven gear 60 is of substantially the same size as gear 64.

The gear ratio from main gear 52 to second driven gear or terminal gear 64 in the embodiment shown is approximately 40:1. Fly wheel 70 is rotatably mounted in support means 40 and fixedly secured through shaft 72 to terminal gear 64. Because of the gear ratio described, fly wheel 70 rotates with an angular velocity about 40 times that of brake wheel 42.

Fly Weights

As seen in FIG. 1, a plurality of fly weights 74 is pivotally attached to side 76 of fly wheel 70 at positions equally spaced angularly around the wheel. The fly weights are preferably formed of cast iron.

Two fly weights 74 are employed in this embodiment, spaced at substantially 180° around fly wheel 70. In FIG. 1 and the succeeding drawings, for convenience the upper fly weight when fly wheel 70 is shown at rest or in stop-action condition will be designated 74a, and the lower fly weight when the wheel is at rest or in stop-action condition will be designated 74b.

Figure 5:
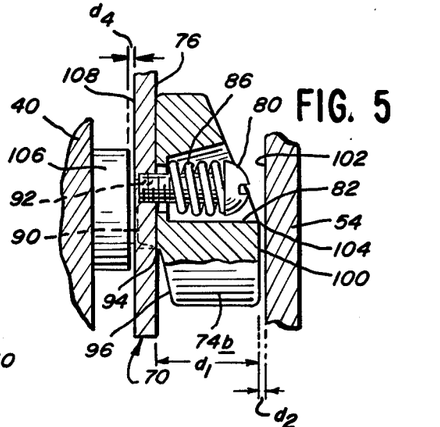
FIG. 5 is a fragmentary sectional view of the bottom portion of the fly wheel and the bottom fly weight of the embodiment of FIGS. 2 through 4 when those members are at rest, taken substantially along the line 5—5 in FIG. 3.
Figure 6:
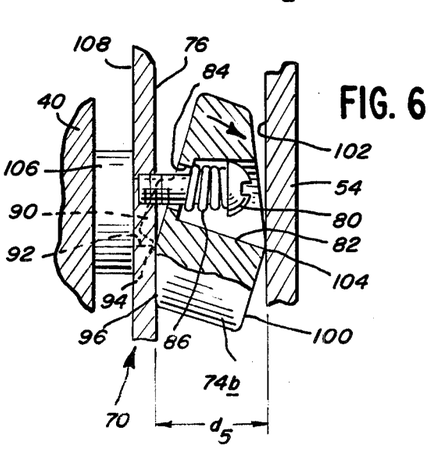
FIG. 6 is a stop-action view of the same members as in FIG. 5, shown in the positions they occupy when they are rotating at maximum speed in the third stage of operation of the retarder of this invention.

The mode of attachment of fly weights 74a and 74b to fly wheel 70 is best seen in FIGS. 5 and 6. FIG. 5 shows fly weight 74b when fly wheel 70 and the fly weight are at rest, and FIG. 6 is a stop-action view of the same two members inthe positions they occupy when they are rotating at maximum speed in the third stage of operation of the retarder of this invention.

As is seen, fly weight 74b is pivotally attached to side 76 of fly wheel 70 by means of bolt 80. Bolt 80 is positioned in cavity 82 in fly weight 74b, and passes loosely through aperture 84 before being threadably inserted in fly wheel 70. Coil spring 86 is positioned around the shank of bolt 80.

Lug 90 extends from fly weight 74b to the left in FIGS. 5 and 6 and is loosely seated in aperture 92 of fly wheel 70. Coil spring 86 normally biases fly weight 74b in the retracted position shown in FIG. 5. When fly wheel 70 rotates, the resulting centrifugal force causes fly weight 74b to pivot clockwise in FIGS. 5 and 6 about pivot 94, so that lug 90 tends to withdraw partially from aperture 92, and in the condition shown in FIG. 6 beveled surface 96 at the bottom of the fly weight is pushed against side 76 of fly wheel 70.

As shown in FIG. 5, when fly wheel 70 and fly weight 74b are at rest, the lower portion of the fly weight defined by surface 100 extends outward normal to side 76 of the fly wheel a first predetermined distance $d_1$. No other portion of fly weight 74b extends that far. The distance between surface 100 of fly weight 74b and inner surface 102 of friction member 54 when the fly wheel and fly weights are at rest as seen in FIG. 5 is a second predetermined distance $d_2$.

Pivoting Of Fly Weights In Second Stage

Figures 7, 8:
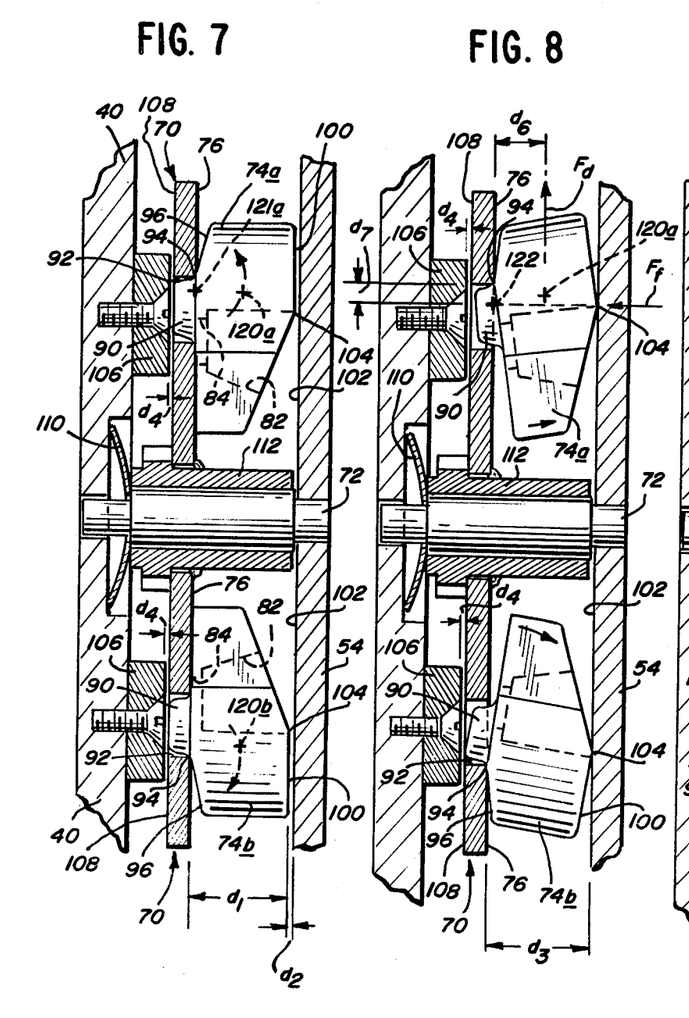
FIGS. 7 through 9 are fragmentary, sectional stop-action views of the fly wheel and attached fly weights, taken along line 7—7 in FIG. 3 and with the means of attaching the fly weights to the rotating fly wheel omitted for clarity, showing the fly weights in the successive positions they occupy as the speed of rotation of the fly wheel increases.
Figure 9:
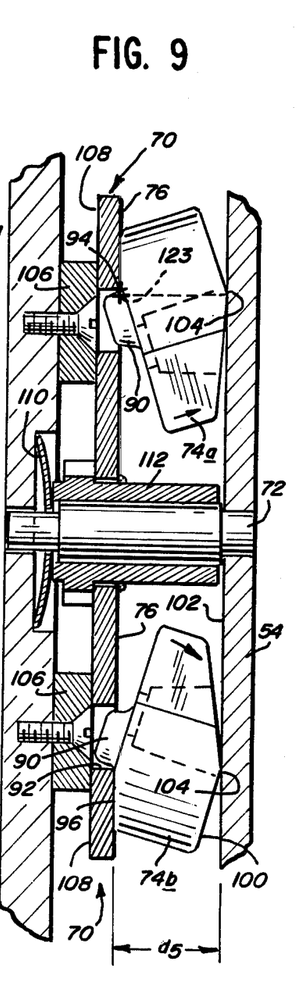

FIGS. 7, 8 and 9 show how both fly weights 74a and 74b carried by fly wheel 70 pivot as the fly wheel and fly weights respond to the rotation of brake wheel 42 that is transmitted through main gear 52 and the remainder of the gear train. (The mode of attachment of the fly weights to the fly wheel, which is shown in FIGS. 5 and 6, is omitted for clarity from FIGS. 7 through 9.) The positions of fly weight 74b in FIGS. 7 and 9 correspond to the positions occupied by the fly weight in FIGS. 5 and 6, respectively.

FIG. 7, like FIG. 5, shows fly wheel 70 and fly weights 74 at rest. When the fly wheel and fly weights rotate, the rotation generates centrifugal forces that cause upper fly weight 74a to rotate in a counterclockwise direction as seen in FIG. 7 and lower fly weight 74b to pivot in a clockwise direction as seen in that Figure. When the linear speed of moving pallet 22 rises above a first predetermined linear speed, the angular velocity with which fly wheel 70 and fly weights 74 rotate becomes greater than a first predetermined angular velocity. When this happens, fly weights 74 move to extended positions as shown in FIG. 8 in which the portions of the respective fly weights defined by surfaces 100 extend outward normal to side 76 of fly wheel 70 a predetermined distance $d_3$, which is the sum of predetermined distances $d_1$ and $d_2$.

In this position, edge 104 of surface 100 is pressed against substantially planar surface 102 of friction member 54. As is perhaps best seen from FIGS. 1 and 2, as well as FIG. 8, the frictional contact between surface 102 and edge 104 pressed against it is theoretically a line contact, although of course in any practical embodiment there will in fact be a contact zone that has an identifiable perimeter and an identifiable area bounded thereby. The area in question will initially be predetermined by the dimensions and spacing selected for the various elements that together comprise the retarder device of this invention, and after a period of some use will be enlarged by the wear that will unavoidably occur in the fly weight as it rotates while pressed against friction member 54.

Further Pivoting Of Fly Weights In Third Stage

The third stage braking force exerted by the retarder device of this invention is applied by reaction snubbers 106, which are mounted on the rear wall of housing 40 (FIGS. 2 and 4–9).

Snubbers 106 are spaced from side 108 of fly wheel 70 by a short distance $d_4$ whenever the fly wheel and fly weights 74 are at rest, and by a somewhat smaller distance when the fly wheel wheel and fly weights are rotating at more than the first predetermined angular velocity referred to above, but less than a second predetermined angular velocity. This spacing between the reaction snubbers and the fly wheel is normally maintained by a resilient biasing means such as spring washer 110, acting through sleeve 112, as best seen in FIGS. 3 and 7–9. However, when the angular velocity of fly wheel 70 and fly weights 74 rises above the second predetermined value just mentioned, fly weights 74 undergo still further pivoting to push the fly wheel against the reaction snubbers, in a manner now to be described, to apply the third stage braking force to moving pallet 22.

The further pivoting of fly weights 74 with increased speed of rotation of fly weight 70 as just described can best be understood by reference to FIGS. 6–9. If the linear speed of moving pallet 22 rises above a second predetermined figure, fly weights 74 will be caused to pivot beyond their positions shown in FIG. 8 and will be pushed still harder against surface 102 of friction member 54. This will at the same time cause the fly weights to push in the opposite direction against fly wheel 70, which pushes sleeve 112 against spring washer 110.

The action described compresses washer 110 from its normal shape shown in FIGS. 7 and 8 to its semi-flattened shape shown in FIG. 9. In other words, pivoting fly weights 74 push sufficiently hard against sleeve 112 and spring washer 110 to overcome the biasing force exerted by the latter member, and press side 108 of fly wheel 70 into frictional contact with reaction snubbers 106, which brings into play the third stage braking force of the retarder device of this invention.

With fly weights 74 in the positions shown in FIG. 9, the spacing between surface 76 of fly wheel 70 and planar surface 102 of friction member 54 is a predetermined distance $d_5$. Distance $d_5$ is the sum of distance $d_3$ (which, in turn, is the sum of distances $d_1$ and $d_2$) plus distance $d_4$.

Mechanical Advantage Of Disk Type Braking

The positioning of centers of gravity 120a and 120b in relation to the respective pivot points 94 for fly weights 74a and 74b in this disk type braking device produces an important mechanical advantage in comparison to known retarder devices of the drum type. This aspect of the retarder device of this invention can best be understood by reference to FIG. 7 (where the paths followed by centers of gravity 120a and 120b during the pivoting of fly weights 74a and 74b are shown in dashed line) and FIG. 8.

The mechanical advantage just mentioned is achieved in the embodiment shown in the drawing (in particular, FIG. 8) by selecting distance $d_6$ between surface 76 of fly wheel 70 and center of gravity 120a of fly weight 74a, measured normal to the median plane of the fly wheel, to be greater than distance $d_7$ between fly weight pivot 94 and perpendicular projection 122 on fly wheel surface 76 of the geometric center of the aforementioned predetermined area of contact between edge 104 of the fly weight and surface 102 of friction member 54. When this relationship between the indicated distances prevails, the resulting mechanical advantage means that the frictional force applied to the fly weight by the friction member is correspondingly greater than the radially directed centrifugal force provided by the rotation of the fly weight.

(Summing the moments of force about pivot 94 for fly weight 74a in FIG. 8 demonstrates that this is so: The frictional moment of force $F_F \times d_7$ must equal the centrifugal moment of force $F_C \times d_6$, and thus the frictional force available by reason of the disk type braking force from the frictional contact between fly weight 74a and friction member 54 is $d_6/d_7$ times as large as the radially directed centrifugal force resulting from rotation of fly weight 74a, which latter force would be the braking force made available in a conventional drum type load retarder device.)

The ratio between the two distances just defined is desirably at least about 3:2, gives improved results if it is at least about 2:1, and is preferably about 5:2.

Because of the mechanical advantage just discussed, the smooth operation of a disk type brake is achieved without the necessity of applying any supplemental power in the operation of the retarder, as is frequently required with disk type braking systems. It is therefore not necessary to install wiring or piping with this pallet flow system to augment by an electrical or air pressure system the power applied to the retarder device by the linear movement of the moving pallets themselves. This retarder device is, in other words, an entirely self-actuated system.

Preferred Positioning Of Centers Of Gravity Of Fly Weights

The larger distance $d_6$ is, the greater will be the mechanical advantage provided by the retarder device of this invention in the second and third stages of its braking action. FIG. 7 shows that when the perpendicular projection 121a on surface 76 of fly wheel 70 of center of gravity 120a is farther from the outer circumference of fly wheel 70 than is pivot 94, center of gravity 120a will swing out away from the fly wheel as fly weight 74a pivots into the position it occupies during the second stage of braking that is shown in FIG. 8. Thus, it is preferred that the perpendicular projections on the fly wheel of the center of gravity of each of fly weights 74 when the fly wheel and fly weights are at rest is farther from the circumference of fly wheel 70 than is pivot 94.

A comparison of FIGS. 7 and 8 with FIGS. 10 and 11 shows that the greater the distance of the perpendicular projection of the center of gravity of the fly weight on surface 76 of fly wheel 70 from the circumference of the fly wheel when the fly wheel and fly weights are at rest, the greater will be the distance of that center of gravity from surface 76 of the fly wheel after the fly weight has pivoted to the positions shown in FIGS. 8 and 11, and thus the greater the resulting mechanical advantage will be. The perpendicular projection 124a on surface 76 of the center of gravity 125a of a fly weight 126a should be at least as far as pivot 94 is from the circumference of fly wheel 70 when the fly wheel and fly weights are at rest (as in FIG. 10), and also when fly weight 126a has pivoted into contact with friction member 54 (as in FIG. 11). Preferably in either of these situations projection 124a of center of gravity 125a should be (as is true in FIGS. 10 and 11) farther from the circumference of fly wheel 70 than pivot 94 is.

In FIG. 10, an alternative shape for fly weight 126a positions the center of gravity of the fly weight at 125a, which as just pointed out is much farther from the circumference of fly wheel 70 than is center of gravity 120a in FIG. 7. As a result, when fly weight 126a is rotated counterclockwise to the position shown in FIG. 11, distance $d_8$ is greater than distance $d_6$ shown in FIG. 7, thereby producing an increased mechanical advantage.

Preferred Positioning Of Contact Between Fly Weights And Friction Member

Another factor that affects the mechanical advantage provided in the second braking stage with the retarder device of this invention is the relative positioning, as shown in FIG. 8, of pivot 94 and perpendicular projection 122 of the area of contact between fly weight 74a and surface 102 of friction member 54. The positioning of the geometric center of projection 122 with respect to pivot 94 determines distance $d_7$, and the smaller this distance is (during the second stage of operation of this retarder device, and later during the third stage), the greater will be the mechanical advantage produced.

As is best seen in FIG. 8, the position of perpendicular projection 122 is preferably such that (1) in the second stage of operation of the retarder device the distance $d_7$ will be as small as possible (in other words, the geometric center of projection 122 will be located as near as possible to pivot 94), so long as (2) the particular portion of perpendicular projection 122 of the area of contact between fly weight 74a and surface 102 of friction member 54 that is farthest from the circumference of fly wheel 70 is at least as far from the circumference of fly wheel 70 as pivot 94 is. This will increase the mechanical advantage obtained while still maintaining the most effective contact between fly weight 74a and friction member 54.

The same is true, as seen in FIG. 9, of projection 123 when fly wheel 70 is pushed against reaction snubber 106 in the third stage of operation of the retarder device of this invention.

The same relationship of parts is also illustrated in FIG. 11 for the second stage of operation of the retarder device of this invention when it includes alternative embodiment 126a of the upper fly weight carried by fly wheel 70. As seen in that Figure, the geometric center of perpendicular projection 127 lies at distance $d_9$ from pivot 94. Distance $d_9$ in FIG. 11 is smaller than distance $d_6$ in FIG. 8, which together with the larger distance $d_8$ discussed above gives an increased mechanical advantage for this retarder device.

Sectional Views Of Retarder Device

Figure 2:
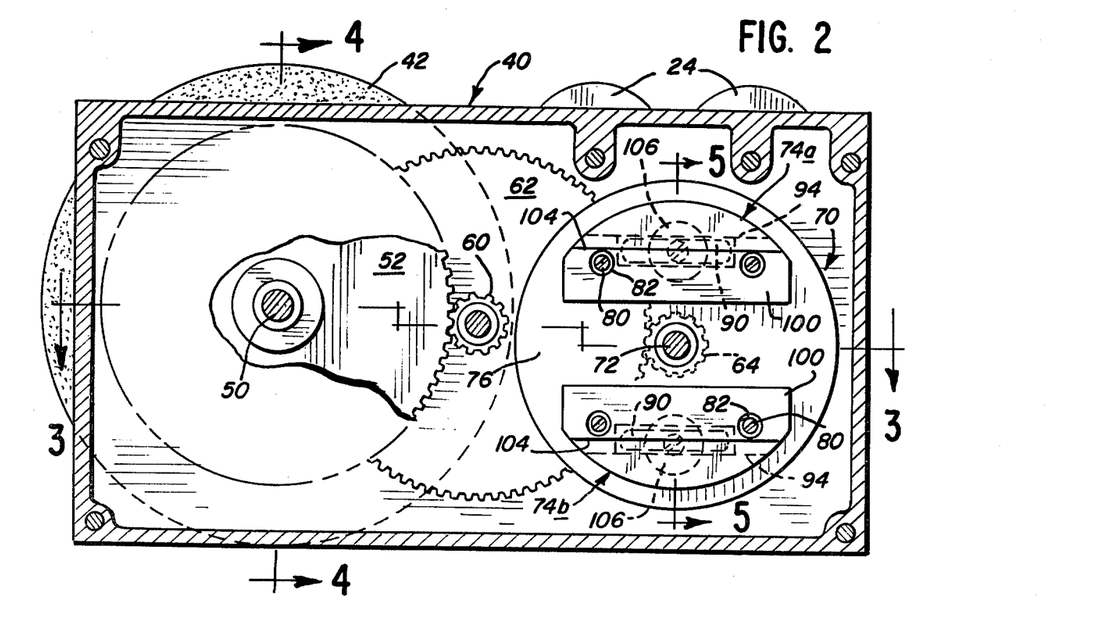
FIG. 2 is a cross sectional view of one embodiment of the retarder device of this invention in its completely assembled form as installed along an inclined track with the housing of the device in place, taken substantially along the plane indicated by lines 2—2 in FIG. 1.
Figure 3:
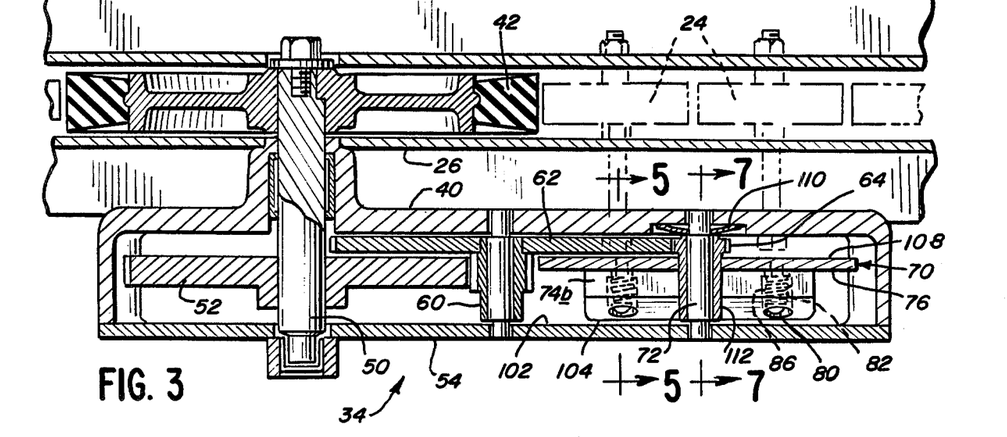
FIG. 3 is a sectional view of the retarder device of FIG. 2, taken substantially along the line 3—3 in the latter Figure.
Figure 4:
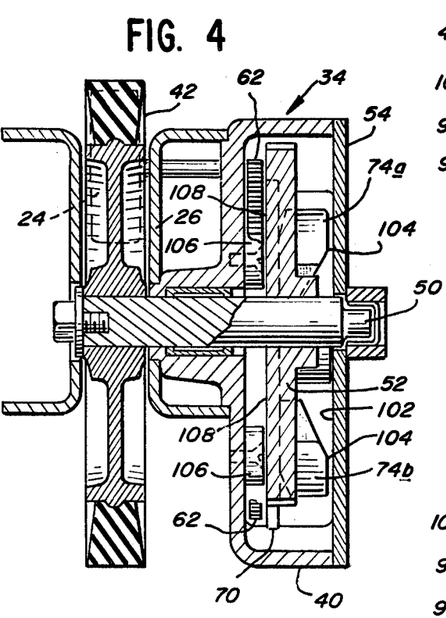
FIG. 4 is a cross sectional view of the embodiment of FIGS. 2 and 3, with parts of the gear train omitted for clarity, taken along the line 4—4 in FIG. 2.

FIGS. 2-4 provide sectional views of the retarder device of this invention that will assist in understanding the construction of the device.

FIG. 2 is a cross sectional view of retarder device 34 taken substantially along the plane indicated by lines 2—2 in FIG. 1. This Figure shows how the linear motion of pallet 22 riding along skate wheels 24 is translated into rotational motion when the pallet strikes brake wheel 42. The rotational motion is then transmitted through shaft 50, main gear 52, first driven gear 60 and intermediate gear 62, to second driven or terminal gear 64, on shaft 72, to which fly wheel 70 is fixedly secured. Because of the gear ratio in the gear train described, in the embodiment disclosed fly wheel 70 rotates with an angular velocity approximately 40 times the angular velocity with which brake wheel 42 rotates.

Fly weights 74a and 74b are shown in the positions they occupy mounted on the near side of fly wheel 70 in FIG. 2. Fly weights 74 are pivotally attached to fly wheel 70 by means of bolts 80 seated in cavities 82 (but with coil springs 86 omitted for clarity). Lugs on the far side of fly weights 74 extend loosely into apertures 92 in the fly wheel.

FIG. 3 is a sectional view of retarder device 34 taken substantially along line 3—3 in FIG. 2. Here, again, the manner in which the linear motion of pallet 22 along skate wheels 24 is converted into the rotational motion of brake wheel 42 can be seen from the top of the Figure. This rotational movement is transferred through shaft 50, main gear 52, first driven gear 60, intermediate gear 62, second driven or terminal gear 64 and shaft 72 to fly wheel 70 at the end of the gear train. Pivoting of fly weight 74b as fly wheel 70 and fly weights 74 rotate presses edge 104 of the fly weight against planar surface 102 of friction member 54. This frictional contact applies the second stage braking force produced by retarder device 34.

FIG. 4 is a cross sectional view, with most of intermediate gear 62 and other parts of the gear train omitted for clarity, taken along line 4—4 in FIG. 2. This Figure shows how the rotational movement of brake wheel 42 is transmitted through shaft 50, main gear 52 and intermediate gear 62 to the end of the gear train where fly wheel 70, carrying fly weights 74a and 74b, is positioned. Second stage braking force is applied by the frictional contact between planar surface 102 of friction member 54 and edges 104 of fly weights 74, when the centrifugal forces developed by rotation of fly wheel 70 cause counterclockwise pivoting of upper fly weight 74a and clockwise pivoting of lower fly weight 74b. Third stage braking force is applied by the frictional contact between planar surface 108 of fly wheel 70 and upper and lower reaction snubbers 106 mounted on housing 40.

Operation Of Retarder Device Of This Invention

In the operation of a typical pallet flow system, a pallet with its accompanying load—such as pallet 22 in FIG. 1—is placed on the rack structure. The pallet is lowered so that its two metal runners 28 that extend along the underside 30 of the pallet are supported on skate wheels 24 of the inclined track. Because the track is inclined downward from the position in which the pallet with its load is first placed on the track, the pallet automatically flows down the incline under the influence of gravity.

Since a pallet flow track can be as long as 100 feet or more, if the pallet were permitted to move freely down the inclined track it would continue to accelerate and gain speed and momentum for the entire length of the track. Thus, for safe utilization of an inclined track for pallet flow, the speed of the pallet must be controlled all along its travel down the track.

In use, retarder device 34 of this invention is installed in the pallet flow track by removing three skate wheels 24, and replacing them with the speed retarder device, at periodic intervals approximately one pallet length apart down the inclined track. With this spacing, as moving pallet 22 breaks contact with one retarder device 34, it immediately contacts the next such device. Because of the braking effect of the successive retarder devices over which the pallet moves, the pallet is prevented from ever building up too much speed.

When the loaded pallet is first placed on the inclined track, it is initially at rest. It is permitted to move a predetermined distance under the influence of gravity in order to build up a minimum flow speed before it makes its first contact with a speed retarder device.

As mentioned above, the rim of brake wheel 42 of the retarder device is preferably formed of a resilient, friction-producing material such as rubber. When pallet 22 comes into contact with brake wheel 42, the linear movement of the pallet along its predetermined path down the inclined track is transformed into rotational movement of the brake wheel, of gear train 52-64 connected with the brake wheel, and of fly wheel 70 which is fixedly secured to terminal gear 64.

The first stage of the application of braking force to the moving pallet results from the frictional resistance of the various moving parts of the retarder device plus the necessity of overcoming the inertia of the various rotating members of the device as the traction between the pallet and the rubber rim of brake wheel 42 causes rotation of the brake wheel. Because the rotating members in this retarder device rotate with very little friction and it takes only a relatively small amount of force to overcome the inertia of the moving parts, the retarding force applied in this stage is relatively small.

In the preferred embodiment of the invention in which the rim or the brake wheel is formed of a resilient material, the initial shock to the moving pallet when the retarding force is first applied to it is relatively slight. If the pallet and its load are not too heavy, the retarding force applied by overcoming the inertia of the moving parts of each successive retarder device with which the pallet comes into contact may be sufficient to hold the descent of the pallet down to a safe speed.

If fly wheel 70 speeds up beyond a first predetermined angular velocity because the linear speed of moving pallet 22 rises above a first predetermined figure, fly weights 74 attached to the fly wheel pivot in response to applied centrifugal forces to move to an extended position in which a portion of each fly weight is at a distance from the fly wheel equal to the sum of the first and second predetermined distances discussed above, in which position they press against friction member 54 located adjacent the fly wheel.

In this second stage of application of retarding forces, the braking force gradually increases as fly wheel 70 and fly weights 74 rotate at a gradually increasing angular velocity greater than the first predetermined velocity discussed above. The faster the fly wheel and the fly weights carried by it rotate as pallet picks up speed down the inclined track, the greater will be the friction between the outwardly moving fly weights and adjacent friction member 54. Hence the speed of movement of the pallet will be reduced, until a balance is struck between the speed of the pallet and the frictional forces produced by the pressing of the outwardly moving fly weights against the adjacent friction member.

A third stage of retarding action is produced if the weight of the pallet and its load is so great that the speed of the moving pallet increases still more, until a portion of each fly weight 74 pivots beyond the above mentioned sum of the first and second predetermined distances measured normal to the side of fly wheel 70. In this condition, each fly weight pushes outward from the fly wheel against the adjacent friction member 54, and at the same time pushes in the opposite direction against the fly wheel through its pivotal attachment to the wheel, and as a result pushes the fly wheel against the abovementioned biasing means such as spring washer 110 to overcome the biasing force exerted by that means. This presses side 108 of fly wheel 70 against reaction snubbers 106 mounted on support means 40 adjacent the fly wheel, which applies a third braking force to the moving pallet in place of the braking force that is applied in the second stage already de- scribed.

Since the coefficient of friction between fly wheel 70 and reaction snubbers 106 (which in the embodiment disclosed are all formed of steel) is greater than the coefficient of friction between fly weights 74 and friction member 54 (the former being formed of cast iron and the latter of steel in the embodiment disclosed), the braking force applied in this third stage is greater than that applied in the second stage.

This third braking force is applied if the angular velocity of fly wheel 70 and fly weights 74 reaches a second predetermined velocity greater than the first predetermined velocity referred to above. It continues to increase gradually if the angular velocity of the fly wheel and fly weights continues to increase. Thus, a gradually increasing braking force is applied if the speed of pallet 22 along the inclined track continues to tend to increase, and as a result the pallet is then slowed down to a safer speed.

If reaction snubber or snubbers 106 are included only to oppose the thrust that would otherwise be applied to the hub of rotating fly wheel 70 and not to produce an increased braking force, the coefficient of friction between the snubber or snubbers and the rotating fly wheel may be the same as, or less than, the coefficient of friction between the fly wheel and the friction member on the other side of the wheel. In such case, a third-stage braking force is not provided by the reaction snubber or snubbers, and the retarder device of this invention applies only a two-stage braking force.

The above detailed description has been given for ease of understanding only. No unnecessary limitations should be understood therefrom, as modifications will be obvious to those skilled in the art.

We claim:

1. A retarder device for gradual, two-stage application of braking force to a moving object as it follows a predetermined path, which comprises:

(a) support means for mounting said device in a fixed position adjacent said predetermined path;

(b) a gear train mounted in said support means, said gear train comprising a plurality of rotatably mounted gears, including at least a first gear and a terminal gear, intermeshed so as to progressively increase the angular velocity of the rotating gears as the first gear in the train is rotated;

(c) means, including a rotatably mounted brake wheel positioned to be contacted by said moving object, for translating linear movement of said object along said predetermined path into rotational movement of said first gear;

(d) a fly wheel rotatably mounted in said support means and fixedly secured to said terminal gear;

(e) at least two fly weights pivotally attached to said fly wheel on one side thereof, each of said fly weights being normally resiliently biased in a retracted position in which a portion of said weight, and only said portion, extends outward normal to said one side of the fly wheel a first predetermined distance; and (f) a friction member having a substantially planar surface, said member being mounted on said support means substantially parallel to said one side of the fly wheel and, when said fly wheel and fly weights are at rest, spaced from said fly weights a second predetermined distance measured normal to said one side of the fly wheel, each of said fly weights pivoting, in response to centrifugal forces generated by rotation of said fly wheel and said fly weights with an angular velocity greater than a first predetermined angular velocity when the linear speed of said moving object rises above a first predetermined linear speed, to move to an extended position in which a portion of said fly weight, and only said portion, extends outward normal to said one side of the fly wheel said first predetermined distance plus said second predetermined distance, said portion of each of said fly weights that moves as thus described in response to said centrifugal forces being pressed against said substantially planar surface of said friction member by said movement, whereby (1) the inertia of said brake wheel, said gear train, said fly wheel, and said fly weights causes said brake wheel to apply to said moving object a first braking force when the object first comes into contact with said brake wheel, and (2) thereafter, if the linear speed of said moving object rises above said first predetermined linear speed and higher, a second, gradually increasing braking force is applied to said object as said fly weights pivot into frictional contact with said friction member in response to centrifugal forces generated by the rotation of said fly wheel and said fly weights at a gradually increasing angular velocity greater than said first predetermined angular velocity.

2. The retarder device of claim 1 in which each of said fly weights pivots about a pivot located on said one side of said fly wheel, said fly weight has contact with a predetermined area of said friction member when it is pressed against the latter, and the distance between the center of gravity of said fly weight and said one side of said fly wheel, measured normal to the median plane of said fly wheel when said fly weight has pivoted into contact with said friction member, is greater than the distance between said fly weight pivot and the geometric center of the perpendicular projection on said fly wheel of said area of contact, so that the frictional force applied to said fly weight by said friction member is correspondingly greater than the centrifugal force produced by the aforesaid rotation of said fly weight.

3. The retarder device fo claim 2 in which the ratio of said first mentioned distance to said second mentioned distance is at least about 3:2.

4. The retarder device of claim 3 in which said ratio is at least about 2:1.

5. The retarder device of claim 4 in which said ratio is about 5:2.

6. The retarder device of claim 2 in which the perpendicular projection of the center of gravity of each of said fly weights on said one side of said fly wheel when the fly wheel and fly weights are at rest is farther from the circumference of said fly wheel than is its said pivot.

7. The retarder device of claim 6 in which said perpendicular projection of said center of gravity is at least as far from the circumference of said fly wheel when said fly weight has pivoted into contact with said friction member as is the perpendicular projection on said one side of said fly wheel of the geometric center of said area of contact.

8. The retarder device of claim 7 in which said perpendicular projection of said center of gravity is farther from the circumference of said fly wheel when said fly weight has pivoted into contact with said friction member than is said perpendicular projection of said geometric center.

9. The retarder device of claim 2 in which, when said portion of the fly weight extends outwardly normal to said one side of the fly wheel said first predetermined distance plus said second predetermined distance, the prependicular projection on said one side of the fly wheel of the particular portion of said area of contact between said fly weight and said friction member that is located farthest from the circumference of the fly wheel is located at least as far from the circumference of the fly wheel as is said pivot of the fly wheel.

10. The retarder device of claim 9 in which, when said portion of the fly weight extends outward normal to said one side of the fly wheel said first predetermined distance plus said second predetermined distance, the geometric center of the perpendicular projection on said one side of the fly wheel of said area of contact between said fly weight and said friction member is located as near as possible to said pivot of the fly weight on the fly wheel.

11. The retarder device of claim 1 in which:

(a) said first gear of said gear train is a main gear rotatably mounted in said support means and fixedly secured to said brake wheel; and (b) said gear train includes:

(i) a first, smaller driven gear rotatably mounted in said support means, said smaller gear being engaged in intermeshing relationship with said main gear;

(ii) an intermediate gear fixedly secured to said first, smaller driven gear; and (iii) a terminal gear in the form of a second, smaller driven gear rotatably mounted in said support means, said smaller gear being engaged in intermeshing relationship with said intermediate gear.

12. The retarder device of claim 11 in which said intermediate gear is generally of the same size as said main gear.

13. The retarder device of claim 11 in which said first and second smaller driven gears are of substantially the same size.

14. The retarder device of claim 1 in which the rim of said brake wheel is formed of a resilient, friction-producing material.

15. The retarder device of claim 14 in which said resilient, friction-producing material is rubber of approximately 40 durometer hardness.

16. The retarder device of claim 1 in which said fly weights are formed of cast iron.

17. The retarder device of claim 16 in which said friction member is formed of steel.

18. The retarder device of claim 1 which has a third stage of gradual application of braking force to said moving object, which includes:
   at least one reaction snubber mounted on said support means adjacent the side of said fly wheel opposite said one side of said wheel on which said fly weights are pivotally attached, the coefficient of friction between said snubbers and said fly wheel being larger than the coefficient of friction between said fly weights and said friction member against which said weights are pressed; and
   means normally resiliently biasing said fly wheel to keep it spaced from said reaction snubbers by a short distance,
   a portion of each of said fly weights pivoted on said fly wheel moving outward in a direction having a component normal to said one side of the fly wheel, if the linear speed of said moving object rises above a second predetermined speed, sufficiently far to push said fly weight against said spaced friction member and thereby causes said fly weight to push at the same time in the opposite direction against said fly wheel, through its pivotal attachment to the fly wheel, sufficiently hard to push the fly wheel against said biasing means to overcome the biasing force exerted by said means and press said opposite side of said fly wheel against said at least one reaction snubber,
   whereby a third, gradually increasing braking force is applied to said moving object larger than the braking force applied by reason of the frictional contact between said rotating fly weights and said stationary friction member, if said fly wheel and said fly weights rotate at a gradually increasing angular velocity above a second predetermined angular velocity that is greater than said first predetermined angular velocity, as the linear speed of said moving object rises above said second predetermined linear speed.

19. The retarder device of claim 18 in which said fly wheel and said at least one reaction snubber are formed of steel and said fly weights are formed of cast iron.

20. The retarder device of claim 18 in which said resilient biasing means comprises a spring washer positioned about the axis of rotation of said fly wheel and in contact with said support means, said spring washer being collapsible under the application of a predetermined amount of pressure.

21. The retarder device of claim 18 in which, when said fly wheel is pushed against said at least one reaction snubber, the perpendicular projection on said one side of the fly wheel of the particular portion of said area of contact between said fly weight and said friction member that is located farthest from the circumference of the fly wheel is located at least as far from the circumference of the fly wheel as is said pivot of the fly wheel.

22. The retarder device of claim 21 in which, when said fly wheel is pushed against said at least one reaction snubber, the geometric center of the perpendicular projection on said one side of the fly wheel of said area of contact between said fly weight and said friction member is located as near as possible to said pivot of the fly weight.

23. The retarder device of claim 1 in which said support means comprises a housing containing said gear train, fly wheel and fly weights, one wall of said housing comprising said friction member against which said fly weights press when said fly wheel and fly weights rotate with an angular velocity greater than said first predetermined angular velocity.

24. The retarder device of claim 1 in which said fly weights are pivotally attached to said one side of said fly wheel at positions equally spaced angularly around said wheel.

25. A retarder device for gradual three-stage application of braking force to a moving object as it follows a predetermined path, which comprises:
   (a) support means for mounting said device in a fixed position adjacent said predetermined path;
   (b) a gear train mounted in said support means, said gear train comprising a plurality of rotatably mounted gears, including at least a first gear and a terminal gear, intermeshed so as to progressively increase the angular velocity of the rotating gears as the first gear in the train is rotated;
   (c) means, including a rotatably mounted brake wheel positioned to be contacted by said moving object, for translating movement of said object along said predetermined path into rotational movement of said first gear, said brake wheels having a rim formed of a resilient, friction-producing material;
   (d) a fly wheel formed of steel and rotatably mounted in said support means and fixedly secured to said terminal gear;
   (e) at least two fly weights formed of cast iron and pivotally attached to said fly wheel on one side thereof at positions substantially equally spaced angularly around said wheel, each of said fly weights being mormally resiliently biased in a retracted position in which a portion of said weight, and only said portion, extends outward normal to said one side of said fly wheel more than a first predetermined distance;
   (f) a friction member formed of steel, said friction member having a substantially planar surface and being mounted on said support means parallel to and, when said fly wheel and fly weight are at rest, spaced from said fly weights a second predetermined distance measured normal to said one side of fly wheel, each of said fly weights pivoting, in response to centrifugal forces generated by rotation of said fly wheel and said fly weights with an angular velocity greater than a first predetermined angular velocity, when the linear speed of said moving object rises above a first predetermined linear speed, to move to an extended position in which a portion of said fly weight, and only said portion, extends outward normal to said one side of the fly wheel said first predetermined distance plus said second predetermined distance, said portion of each of said fly weights that moves as thus described in response to said centrifugal forces being pressed against said substantially planar surface of said friction member by said movement, each of said fly weights pivoting about a pivot located on said one side of said fly wheel, said fly weight having contact with a predetermined area of said friction member when it is pressed against the latter, the ratio of the distance between the center of gravity of said fly weight to said one side of said fly wheel, measured normal to the plane of said fly wheel when the fly wheel and fly weights are at rest, to the distance between said pivot for said fly weight and the geometric center of the perpendicular projection on said fly wheel of said area of contact between about 5:2;

(g) at least one reaction snubber formed of steel mounted on said support means adjacent the side of said fly wheel opposite said one side of said wheel on which said fly weights are pivotally attached; and (h) means normally resiliently biasing said fly wheel to keep it spaced from said reaction snubbers by a short distance, said biasing means comprising a spring washer collapsible under the application of a predetermined amount of pressure, said spring washer being positioned about the axis of rotation of said fly wheel and in contact with said support means, a portion of each of said fly weights pivoted on said fly wheel moving outward in a direction having a component normal to said one side of the fly wheel, if the linear speed of said moving object rises above a second predetermined speed, sufficiently far to push said fly weight against said spaced friction member and thereby cause said fly weight to push at the same time in the opposite direction against said fly wheel, through its pivotal attachment to the fly wheel, sufficiently hard to push the latter against said biasing means to overcome the biasing force exerted by said means and press said opposite side of said fly wheel against said reaction snubbers, whereby the inertia of said brake wheel, said gear train, said fly wheel, and said fly weights causes said brake wheel to apply to said moving object a first braking force when the object first comes into contact with said brake wheel, thereafter, if the linear speed of said moving object rises above said first predetermined linear speed and higher, a second, gradually increasing braking force is applied to said object as said fly weights pivot into moving frictional contact with said friction member in response to centrifugal forces generated by the rotation of said fly wheel and said fly weights at a gradually increasing angular velocity greater than said first predetermined angular velocity, and a third, gradually increasing braking force larger than said second braking force is applied to said moving object if said fly wheel and said fly weights rotate at a gradually increasing angular velocity above a second predetermined angular velocity that is greater than said first predetermined angular velocity, as the linear speed of said moving object rises above said second predetermined linear speed.

26. A retarder device for gradual, two-stage application of braking force to a moving object as it follows a predetermined path, which comprises:
(a) support means for mounting said device in a fixed position adjacent said predetermined path;
(b) a gear train mounted in said support means, said gear train comprising a plurality of rotatably mounted gears, including at least a first gear and a terminal gear, intermeshed so as to progressively increase the angular velocity of the rotating gears as the first gear in the train is rotated;
(c) means, including a rotatably mounted brake wheel positioned to be contacted by said moving object, for translating linear movement of said object along said predetermined path into rotational movement of said first gear;
(d) a fly wheel rotatably mounted in said support means and fixedly secured to said terminal gear;
(e) a fly weight pivotally attached to said fly wheel on one side thereof, said fly weight being normally resiliently biased in a retracted position in which a portion of said weight, and only said portion, extends outward normal to said one side of the fly wheel a first predetermined distance; and
(f) a friction member having a substantially planar surface, said member being mounted on said support means parallel to and, when said fly wheel and fly weight are at rest, spaced from said fly weight a second predetermined distance measured normal to said one side of the fly wheel, said fly weight pivoting, in response to centrifugal force generated by rotation of said fly wheel and said fly weight with an angular velocity greater than a first predetermined angular velocity when the linear speed of said moving object rises above a first predetermined linear speed, to move to an extended position in which a portion of said fly weight, and only said portion, extends outward normal to said one side of the fly wheel said first predetermined distance plus said second predetermined distance, said portion of said fly weight that moves as thus described in response to said centrifugal forces being pressed against said substantially planar surface of said friction member by said movement, whereby (1) the inertia of said brake wheel, said gear train, said fly wheel, and said fly weight causes said brake wheel to apply to said moving object a first braking force when the object first comes into contact with said brake wheel, and (2) thereafter, if the linear speed of said moving object rises above said first predetermined linear speed and higher, a second, gradually increasing braking force is applied to said object as said fly weight pivots into frictional contact with said friction member in response to centrifugal force generated by the rotation of said fly wheel and said fly weight at a gradually increasing angular velocity greater than said first predetermined angular velocity.

* * * * *